R. E. HELLMUND.
SYSTEM OF CONTROL.
APPLICATION FILED JUNE 18, 1919.

1,421,229.

Patented June 27, 1922.
2 SHEETS—SHEET 1.

WITNESSES:
H.J.Shelhamer
W.R.Coley

INVENTOR
Rudolf E. Hellmund
BY
Wesley G. Carr
ATTORNEY

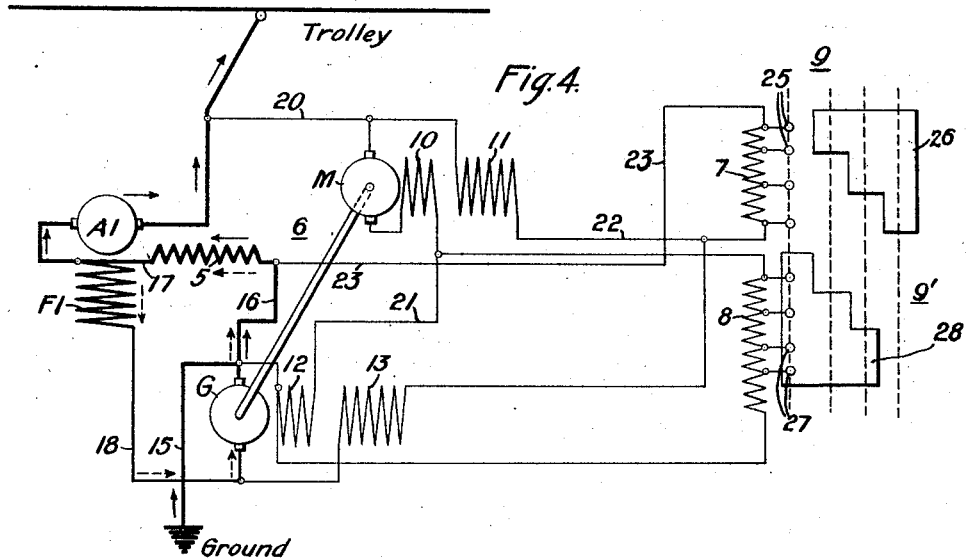
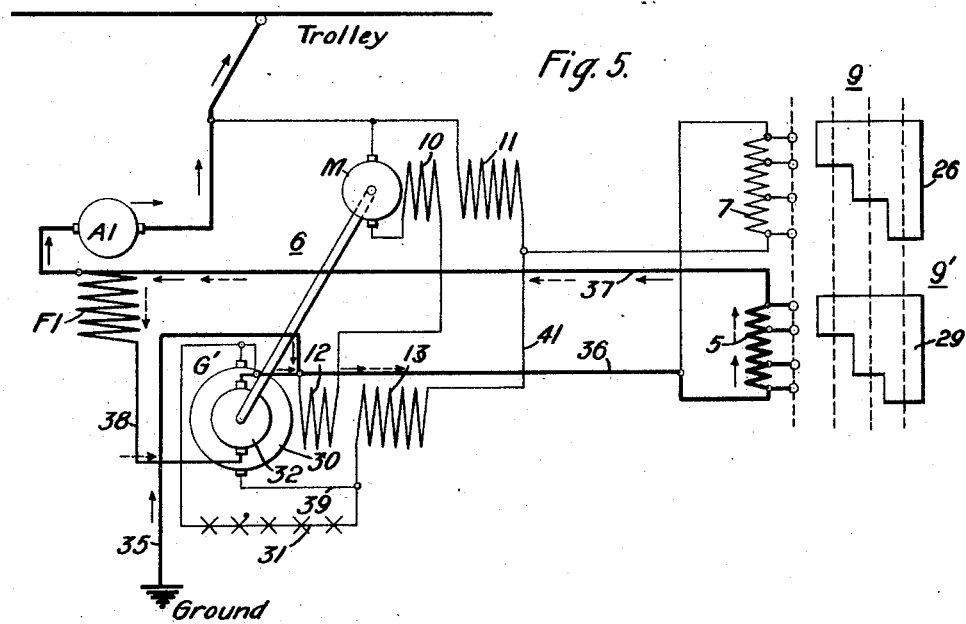

UNITED STATES PATENT OFFICE.

RUDOLF E. HELLMUND, OF SWISSVALE, PENNSYLVANIA, ASSIGNOR TO WESTING-HOUSE ELECTRIC & MANUFACTURING COMPANY, A CORPORATION OF PENNSYLVANIA.

SYSTEM OF CONTROL.

1,421,220.  Specification of Letters Patent.  Patented June 27, 1922.

Application filed June 18, 1919. Serial No. 305,104.

*To all whom it may concern:*

Be it known that I, RUDOLF E. HELL-MUND, a citizen of the German Empire, and a resident of Swissvale, in the county of Allegheny and State of Pennsylvania, have invented a new and useful Improvement in Systems of Control, of which the following is a specification.

My invention relates to systems of control for dynamo-electric machines and it has special relation to the prevention of overvoltages during regenerative operation, for example, of an electric-railway motor.

The object of my invention is to provide an auxiliary machine, or other exciter means, for a main machine, together with a combination of energizing circuits for the exciter that are connected to inherently vary the voltage of the exciter oppositely over different operating ranges of the main machine.

More specifically stated, it is the object of my invention to provide an exciter machine for a momentum-driven electric-railway motor, or the like, the auxiliary machine having a plurality of energizing field windings that are inherently adapted to assist each other when the regenerated voltage is below a predetermined normal value and to oppose each other when such voltage is above that value, whereby the maximum value of the regenerated voltage is inherently limited. In this way, the well-known undesirable effects of unduly high regenerated voltages are inherently prevented without necessitating the use of the customary overvoltage relay device.

Figure 1:
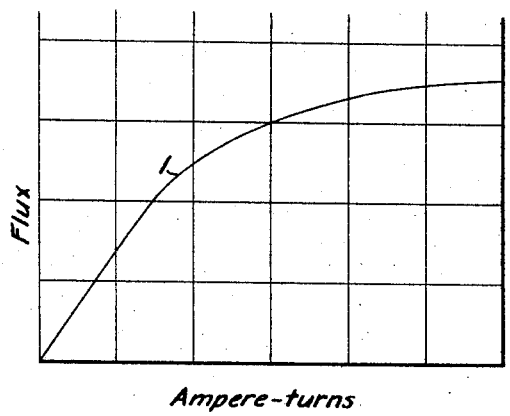
Figure 2:
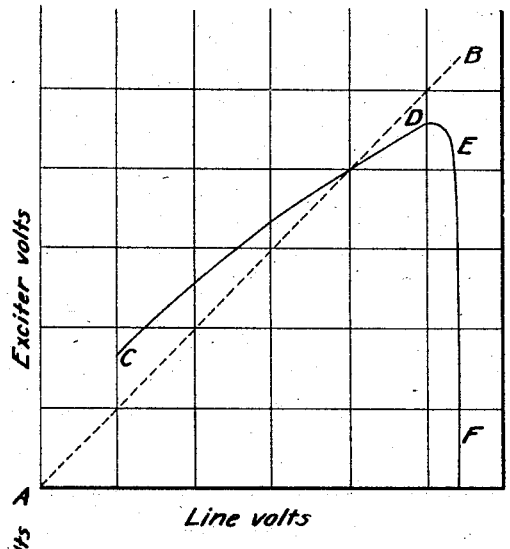
Figure 3:
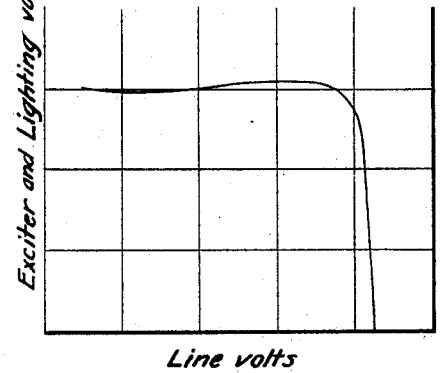

My invention may best be understood by reference to the accompanying drawings, wherein Fig. 1 to Fig. 3, inclusive, are curve charts indicating the relations between various designated electrical conditions during the operation of my control system; Fig. 4 is a diagrammatic view of the essential main and auxiliary circuits of a system embodying my invention; and Fig. 5 is a diagrammatic view of a modified form of the invention.

The curve 1 of Fig. 1 is a magnetic-saturation curve indicating the relation between ampere-turns and flux in an auxiliary exciting machine that is employed in connection with the present invention, whereby the delivered voltage of the exciter, with respect to the line or supply-circuit voltage, follows the solid-line curve CDEF of Fig. 2. The specific field-winding connections for producing a voltage curve of the type shown will be described later in connection with Fig. 4 and Fig. 5, but it should be noted here that the "exciter volts" increase over a certain operating range of the main machine during the regenerative period until a predetermined maximum or critical value is reached, when the voltage of the exciter rapidly drops; in other words, the voltage of the exciter varies oppositely over different operating ranges of the main machine.

The desirability of providing an exciter machine having a voltage characteristic such as that shown in Fig. 2 has already been mentioned with regard to the prevention of injurious effects in a regenerative-control system. Furthermore, throughout the normal range of operation, the exciter voltage is substantially proportional to the line voltage, as indicated by comparison with the dotted straight line AB.

Referring to Fig. 4, the system here shown comprises supply-circuit conductors Trolley and Ground for furnishing energy to, or receiving energy from, a main dynamo-electric machine having a commutator-type armature A1 and a field winding F1 of the heavy-coil series type which is excited by means of a motor-generator set 6, comprising an auxiliary generating armature G that is driven from the supply circuit through the agency of an auxiliary-motor armature M.

A main-circuit stabilizing resistor 5 is provided for a purpose to be set forth, while a plurality of variable resistors 7 and 8, which are respectively governed by independent multi-position controllers 9 and 9', are connected to the auxiliary-machine circuits in a manner to be described.

The motor-generator set 6, in addition to the armatures M and G, comprises field windings 10 and 11 for the driving armature M, which are respectively connected in series relation with, and in shunt relation to, the armature, and a plurality of energizing field windings 12 and 13 for the exciting armature G, which are respectively connected in series relation with the driving armature M and in parallel relation to the generating armature G.

Assuming that the system is connected as shown to effect regenerative operation of the main machine, the main-armature or regenerative circuit, indicated by the solid arrows, is established from the supply-circuit conductor Ground through conductors 15 and 16, stabilizing resistor 5, conductor 17, main armature A1, and thence to the trolley.

The main-field-winding or exciting circuit, indicated by the dotted arrows, is established from the positive terminal of the generating armature G through conductor 16, stabilizing resistor 5, which is traversed by the exciting current in the same direction as that taken by the regenerative current, whence circuit is continued through conductor 17, main field winding F1 and conductor 18 to the negative terminal of the generating armature G.

An auxiliary circuit is established from the trolley through conductor 20, driving armature M, field winding 10 therefor, conductor 21, field winding 12 for the exciting armature G, and conductor 15 to ground. Another auxiliary field-winding circuit is continued from the conductor 20 through field winding 11 for the driving armature M, conductor 22, variable resistor 7 and conductor 23, whence circuit is completed through conductors 16 and 15 to ground.

The variable resistor 7 is also connected in circuit with the field winding 13 for the exciting armature G, this circuit being connected across the terminals of that armature. In addition, the variable resistor 8 is connected in parallel relation to the field winding 12 for the exciting armature, whereby the degree of excitation thereof, in accordance with the load of the motor-generator set 6, may be adjusted at will.

It will be understood that any well-known device for varying the active circuit value of the resistors 7 and 8 may be utilized, the present arrangement being shown for illustrative purposes only and comprising a plurality of control fingers 25 which may be engaged by a contact segment 26 of the controller 9 to gradually short-circuit the resistor 7 during the regenerative period, while a plurality of control fingers 27 initially engage a contact segment 28 of the controller 9' to short-circuit the major portion of the resistor 8, the active circuit value of which is gradually increased as the controller 9' is forwardly actuated during regenerative operation of the main machine.

The function of the stabilizing resistor 5 is to inherently vary the main-field-winding excitation oppositely to concurrent variations of current in the main armature. However, the particular main-circuit connections shown, while preferably employed in the present invention, are not essential. These connections are fully set forth in my co-pending application, Serial No. 44,443, filed August 9, 1915, granted Apr. 1, 1919, No. 1,298,706, and no further description thereof is deemed necessary here.

The proportion of parts in the illustrated system is preferably such that, under normal-voltage conditions of the main machine, for example, 600 volts in an electric-railway system, the auxiliary field winding 13 for the exciting armature G carries substantially zero resultant current, whereas, under lower-voltage conditions, the flux emitted by the field winding 13 assists that of the associated field winding 12 and, under higher-voltage conditions, the two field windings 12 and 13 oppose each other. Furthermore, the best results are obtained when, under normal-voltage conditions of the main machine, the magnetic saturation of the auxiliary motor is considerably lower than that of the auxiliary exciter. Since the assisting or opposing effect of the auxiliary field winding 13 is produced by a reversal of current therein, it follows that the resistor 7 carries either the sum or the difference of the currents traversing field windings 11 and 13, which are both connected to that resistor. It may be demonstrated mathematically that, by selecting the proper value of the resistor 7, with respect to the resistance of the associated field windings 11 and 13, the desired result of a substantially constant delivered voltage tends to be inherently secured. Preferably, also, the polar projections of the auxiliary motor should be provided with some form of damper winding, such as the well-known grid, for preventing the motor-generator set from "flashing over" whenever the supply-circuit voltage fluctuates.

The system shown in Fig. 5 is adapted to furnish both the exciting current for the main motor and a lighting current of a different voltage. The single armature winding G of Fig. 4 is replaced by a double-winding armature G', one armature winding 30 being connected to the load-circuit 31, comprising a plurality of car-lighting lamps, for example, while a second armature winding 32 is employed for the purpose of exciting the main field winding F1.

In the present instance, the stabilizing resistor 5 is made adjustable by means of a contact segment 29 on the controller 9', while the variable resistor 7 occupies the same circuit location and performs the same functions as before.

The armature G' is of the familiar double-commutator type, separate armature windings being preferably connected to the respective commutators, although the same core slots are employed. Since this type of machine is old in the art, no further exposition thereof is considered necessary.

The regenerative circuit, therefore, as indicated by the solid arrows, is established from ground through conductors 35 and 36, stabilizing resistor 5, conductor 37 and main armature A1 to the trolley.

The exciting circuit, as indicated by the dotted arrows, is established from the positive terminal of the generating armature 32 through conductor 36, stabilizing resistor 5, conductor 37, main field winding F1 and conductor 38 to the negative terminal of the generating armature 32.

The remaining circuits are similar to those already described in connection with Fig. 4, and require no further discussion.

The auxiliary field winding 13 for the generating armature G' is preferably energized from the armature-winding 30, having the higher voltage, since such connection affords more favorable conditions for obtaining the proper voltage-regulation through the medium of the resistor 7. By the proper selection of electrical constants and characteristics of the auxiliary circuits, a voltage curve for both armatures 30 and 32, similar to that shown in Fig. 3, may be obtained. In other words, a substantially constant voltage is delivered to the main field winding F1 over the normal working range of the main machine and, at the same time, a substantially constant voltage, of a different value, is provided for car-lights, which is a very desirable feature.

However, if the generated voltage of the main machine exceeds a critical value, the voltages of the exciter armatures suddenly decrease towards zero, as indicated by the curve of Fig. 3, and effectively preclude the building up of a dangerous main-machine voltage.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. The combination with a momentum-driven dynamo-electric machine having an armature and a field winding, of means for exciting said field winding to effect regenerative operation of said machine, and means comprising energizing circuits for said exciting means connected to inherently vary the voltage of said exciting means to maintain regenerative operation only unless a predetermined machine voltage is reached.

2. The combination with a momentum-driven dynamo-electric machine having an armature and a field winding, of an auxiliary dynamo-electric machine armature for exciting said field winding to effect regenerative operation of said machine, and means comprising a plurality of field windings for the auxiliary armature connected to inherently maintain regenerative operation only unless a predetermined machine voltage is exceeded.

3. The combination with a momentum-driven dynamo-electric machine having an armature and a field winding, of an auxiliary dynamo-electric machine armature for exciting said field winding to effect regenerative operation of said machine, a field winding for energizing said auxiliary armature, and a second field winding connected to assist or oppose the first-named auxiliary field winding according as the regenerated voltage is lower or higher than a predetermined normal value, whereby the maximum value of such voltage is inherently limited.

4. The combination with a dynamo-electric machine, of an auxiliary armature for exciting said machine, a driving armature for said exciting armature, a resistor, and a field winding for the respective auxiliary armatures connected in circuit with said resistor.

5. The combination with a supply circuit and a momentum-driven dynamo-electric machine having an armature and a field winding, of an auxiliary dynamo-electric machine armature for exciting said field winding to effect regenerative operation of said machine, a driving armature for said exciting armature, a resistor, and a field winding for the auxiliary armature respectively connected in series relation with said resistor across the supply circuit and in series relation with said resistor across the exciting armature.

6. The combination with a supply circuit and a main dynamo-electric machine, of an auxiliary armature for exciting said machine, a driving armature for said exciting armature, a resistor for said driving armature connected in circuit with said armature, a first field winding for energizing the exciting armature, and a second field winding for the exciting armature connected in circuit with said resistor to assist or oppose said first field winding in accordance with the relation of the main-machine voltage to the normal supply-circuit voltage.

7. The combination with a supply circuit and a momentum-driven dynamo-electric machine having an armature and a field winding, of an auxiliary dynamo-electric machine armature for exciting said field winding to effect regenerative operation of said machine, a driving armature for said exciting armature, a resistor, a field winding for said driving armature connected in series relation with said resistor across the supply circuit, a first field winding for energizing the exciting armature, and a second field winding therefor connected in circuit with said resistor across the exciting armature to assist or oppose said first field winding according as the regenerated voltage is lower or higher than a predetermined normal value.

In testimony whereof, I have hereunto subscribed my name this 6th day of June, 1919.

RUDOLF E. HELLMUND.